United States Patent
Ye et al.

(10) Patent No.: US 9,386,583 B2
(45) Date of Patent: Jul. 5, 2016

(54) METHODS AND SYSTEMS FOR DETERMINING UPLINK RESOURCES

(71) Applicant: Alcatel-Lucent, Paris (FR)

(72) Inventors: Sigen Ye, New Providence, NJ (US); Matthew P J Baker, Canterbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/953,093

(22) Filed: Jul. 29, 2013

(65) Prior Publication Data

US 2014/0044062 A1 Feb. 13, 2014

Related U.S. Application Data

(60) Provisional application No. 61/681,821, filed on Aug. 10, 2012.

(51) Int. Cl.
H04W 72/04 (2009.01)
H04W 72/00 (2009.01)
H04L 5/00 (2006.01)
H04L 1/18 (2006.01)

(52) U.S. Cl.
CPC ......... *H04W 72/0453* (2013.01); *H04L 1/1812* (2013.01); *H04L 5/0053* (2013.01); *H04L 5/0055* (2013.01); *H04L 5/0091* (2013.01); *H04W 72/00* (2013.01); *H04W 72/042* (2013.01); *H04W 72/0413* (2013.01); *H04L 1/1861* (2013.01)

(58) Field of Classification Search
None
See application file for complete search history.

(56) References Cited

U.S. PATENT DOCUMENTS

| | | | |
|---|---|---|---|
| 2013/0064216 A1* | 3/2013 | Gao et al. | 370/330 |
| 2013/0194931 A1* | 8/2013 | Lee et al. | 370/241 |
| 2013/0230030 A1* | 9/2013 | Papasakellariou et al. | 370/336 |
| 2013/0242890 A1* | 9/2013 | He et al. | 370/329 |
| 2014/0003375 A1* | 1/2014 | Nam et al. | 370/329 |
| 2014/0036810 A1* | 2/2014 | Harrison et al. | 370/329 |
| 2014/0241298 A1* | 8/2014 | Park et al. | 370/329 |
| 2014/0307700 A1* | 10/2014 | Seo et al. | 370/329 |
| 2015/0003349 A1* | 1/2015 | Kim et al. | 370/329 |

OTHER PUBLICATIONS

International Search Report and Written Opinion dated Dec. 5, 2013.
Research in Motion et al., "Discussion on PUCCH A/N Resource Mapping for E-PDCCH," 3GPP Draft, Aug. 5, 2012.
Catt, "PUCCH resource for E-PDCCH," 3GPP, Aug. 5, 2012.
LG Electronics, "On Aggregation ECCEs for EPDCCH Candidate," 3GPP, Aug. 5, 2012.
Samsung, "HARQ-ACK PUCCH Resources in Response to ePDCCH Detections," May 12, 2012.

* cited by examiner

*Primary Examiner* — Hicham Foud
(74) *Attorney, Agent, or Firm* — Harness, Dickey & Pierce, P.L.C.

(57) ABSTRACT

At least one example embodiment discloses a method of determining uplink resources. The method includes assigning index values for control channel elements. The control channel elements are allocated to at least one of first and second control channel transmission sets. The uplink resources being are based on the index values and an uplink resource for the first control channel transmission is different than an uplink resource for the second control channel transmission.

9 Claims, 6 Drawing Sheets

METHODS AND SYSTEMS FOR DETERMINING UPLINK RESOURCES

CROSS-REFERENCE TO RELATED APPLICATION(S)

This non-provisional U.S. patent application claims priority under 35 U.S.C. §119(e) to provisional U.S. patent application No. 61/681,821, filed on Aug. 10, 2012, the entire contents of which are incorporated herein by reference.

BACKGROUND

Long-Term Evolution (LTE)-Advanced provides a control channel known as the Enhanced Physical Downlink Control Channel (EPDCCH). The EPDCCH is transmitted in one or more physical resource block (PRB) pairs in a subframe. The EPDCCH supports both distributed and localized transmission in the frequency domain.

A basic resource unit known as an Enhanced Resource Element Group (EREG) has been defined for the EPDCCH. The mapping of EREGs to resource elements (REs) is fixed in $3^{rd}$ Generation Partnership Project (3GPP) Long-Term Evolution (LTE) standard specifications. Within each PRB pair, the EREG indices are sequentially mapped to REs, while excluding the REs for demodulation reference signals (24 for normal cyclic prefix (CP) and 12 for extended CP), in a frequency first and then time manner.

Each distributed or localized transmission of control information uses a group of EREGs. Multiple EREGs are sometimes grouped together as Enhanced Control Channel Elements (ECCEs). In this case, each EPDCCH transmission uses one or multiple ECCEs.

An EPDCCH transmission set may be defined as a group of P PRB pairs, where P={1 (FFS), 2, 4, 8} for localized transmission, and P={2, 4, 8, 16 (FFS)} for distributed transmission.

SUMMARY

With the use of an EPDCCH, one issue is how to determine a Physical Uplink Control Channel HARQ-ACK (Physical Downlink Control Channel Hybrid Automatic Repeat Request) resource for sending the ACK/NACK in response to the downlink grants sent over EPDCCH.

The inventors have discovered methods for indexing the ECCEs and mapping PUCCH resources based on the ECCE index. Moreover, the inventors have discovered an ECCE indexing scheme such that a unique uplink resource can be defined for each localized and distributed transmission.

At least one example embodiment discloses a method of determining uplink resources. The method includes assigning index values for control channel elements, the control channel elements being allocated to at least one of first and second control channel transmission sets, the uplink resources being based on the index values, and an uplink resource for the first control channel transmission being different than an uplink resource for the second control channel transmission.

In an example embodiment, the control channel elements are enhanced control channel elements.

In an example embodiment, the first control channel transmission set are for localized transmissions and the second control channel transmission set are for distributed transmissions.

In an example embodiment, the assigning index values includes assigning the index values for the first control channel transmission set such that the index values for the first control channel transmission set are sequential.

In an example embodiment, the assigning index values includes assigning the index values for the second control channel transmission set such that the index values for the second control channel transmission set are sequential.

In an example embodiment, the uplink resource is based on the index values for at least one of the control channel elements used by one of the first and second control channel transmissions and an offset.

In an example embodiment, the offset corresponds to a number of control channel elements in one of the first and second control channel transmission sets.

In an example embodiment, the assigning index values for control channel elements includes assigning the index values for the first control channel transmission set such that the index values for the first control channel transmission set are sequential and assigning virtual index values for the second control channel transmission set based on the index values for the first control channel transmission set.

In an example embodiment, the assigning virtual index values for the second control channel transmission set includes determining a first resource element group in a first distributed control channel element, determining a position of the first resource element group in the localized control channel element and determining the virtual index value for the first distributed control channel element based on the position of the first resource element group in the localized control channel element.

In an example embodiment, the first and second control channel transmission sets share a same set of physical resource block pairs.

In an example embodiment, the first and second control channel transmission sets have different sets of physical resource block pairs.

At least one example embodiment discloses a base station including a memory and a processor configured to assign index values for control channel elements, the control channel elements being allocated to at least one of first and second control channel transmission sets, uplink resources being based on the index values, and an uplink resource for the first control channel transmission being different than an uplink resource for the second control channel transmission.

In an example embodiment, the processor is configured to assign the index values for the first control channel transmission set such that the index values for the first control channel transmission set are sequential.

In an example embodiment, the processor is configured to assign the index values for the second control channel transmission set such that the index values for the second control channel transmission set are sequential.

In an example embodiment, the processor is configured to assign the index values for the first control channel transmission set such that the index values for the first control channel transmission set are sequential and assign virtual index values for the second control channel transmission set based on the index values for the first control channel transmission set.

In an example embodiment, the processor is configured to determine a first resource element group in a first distributed control channel element, determine a position of the first resource element group in the localized control channel element and determine the virtual index value for the first distributed control channel element based on the position of the first resource element group in the localized control channel element.

In an example embodiment, the first and second control channel transmission sets share a same set of physical resource block pairs.

In an example embodiment, the first and second control channel transmission sets have different sets of physical resource block pairs.

At least one example embodiment discloses a user equipment (UE) including a memory and a processor, the processor configured to determine uplink channel resources based on index values of control channel elements on the downlink, the control channel elements being allocated to at least one of first and second control channel transmission sets, an uplink resource for the first control channel transmission being different than an uplink resource for the second control channel transmission.

BRIEF DESCRIPTION OF THE DRAWINGS

Example embodiments will be more clearly understood from the following detailed description taken in conjunction with the accompanying drawings. FIGS. 1-5B represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

With the use of an EPDCCH, one issue is how to determine the PUCCH HARQ-ACK (Physical Uplink Control Channel Hybrid Automatic Repeat Request) resource for sending the ACK/NACK in response to the DL grants sent over EPDCCH.

The inventors have discovered methods for indexing the ECCEs and mapping PUCCH resources based on the ECCE index.

In an example embodiment, for localized transmission, one PRB (Physical Resource Block) pair is partitioned into a few disjoint ECCEs, so each "localized ECCE" is contained within one PRB pair. However, for distributed transmission, each "distributed ECCE" consists of a few EREGs that are distributed in different PRB pairs.

Figure 1:
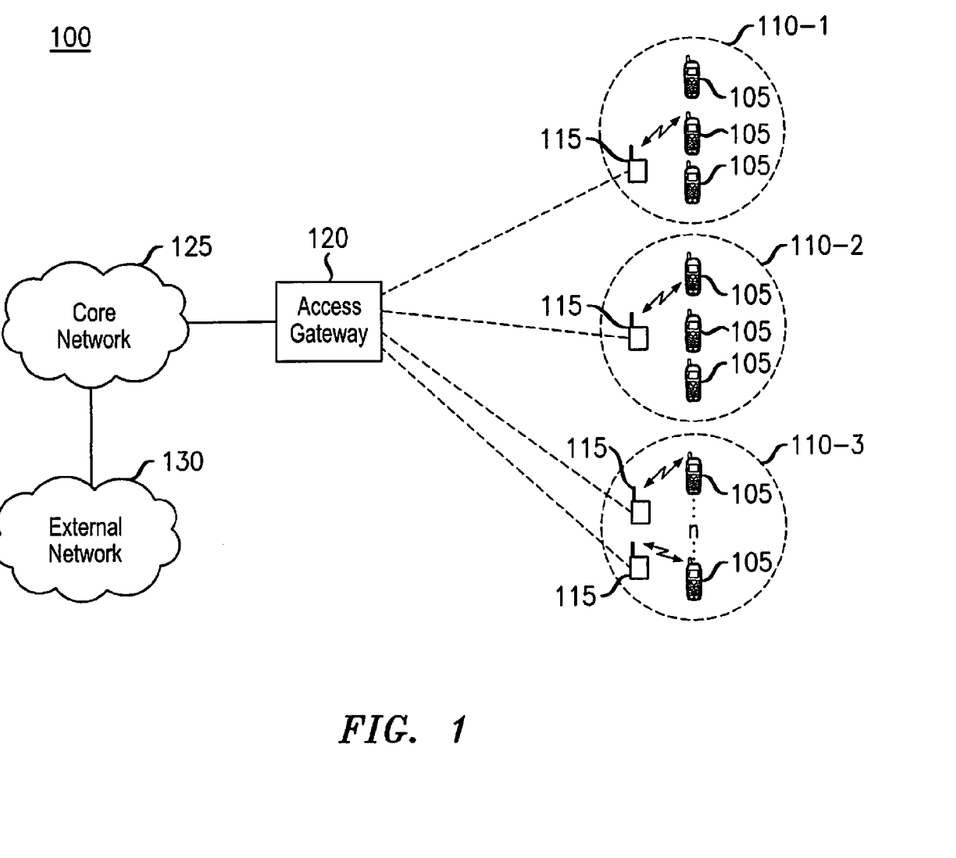
FIG. 1 illustrates a wireless communication network according to an example embodiment.

FIG. 1 illustrates a wireless communication network 100 including an access gateway 120 communicatively coupled to one or more eNodeBs 115. The access gateway 120 is also communicatively coupled to a core network (CN) 125 that is, in turn, communicatively coupled to one or more external networks 130, such as the Internet and/or other circuit and/or packet data networks. Based on this arrangement, the network 100 communicatively couples user equipments (UEs) 105 to each other and/or to other user equipments or systems accessible via the external networks 130.

For example purposes, the wireless network 100 will be described herein as an Evolved Universal Terrestrial Radio Access Network (E-UTRAN). However, it should be understood that example embodiments may also be implemented in conjunction with other networks.

Referring to FIG. 1, the E-UTRAN 100 includes eNodeBs 115, which provide the Evolved Universal Terrestrial Radio Access (E-UTRA) user plane (PDCP/RLC/MAC/PHY) and radio resource control (RRC) plane protocol terminations with user equipments (UEs) 105. The eNodeBs 115 are interconnected with each other by an X2 interface.

As discussed herein, eNodeB 115 refers to a base station that provides radio access to UEs 105 within a given coverage area (e.g., 110-1, 110-2, 110-3). This coverage area is referred to as a cell. However, as is known, multiple cells are often associated with a single eNodeB.

As discussed herein, base stations (e.g., eNodeB) may have all functionally associated with conventional, well-known base stations in addition to the capability and functionality to perform the methods discussed herein.

Collectively, UEs and eNodeBs may be referred to herein as "transceivers" or "radio frequency equipments."

Still referring to FIG. 1, the access gateway 120 is communicatively coupled to the eNodeBs 115. The access gateway 120 includes a logical entity that controls the eNodeBs 115 and coordinates multi-cell scheduling and transmission for eNodeBs 115 belonging to the same Multimedia Broadcast Single Frequency Network (MBSFN) area. For example, as is known, the access gateway 120 controls, inter alia, user radio access network (RAN) mobility management procedures and user session management procedures. More specifically, for example, the access gateway 120 controls a UE's tracking and reachability. The access gateway 120 also controls and executes transmission and/or retransmission of signaling messages, such as paging messages for notifying destination UEs of impending connection requests (e.g., when UEs are being called or when network initiated data intended for the UE is coming).

Figure 2:
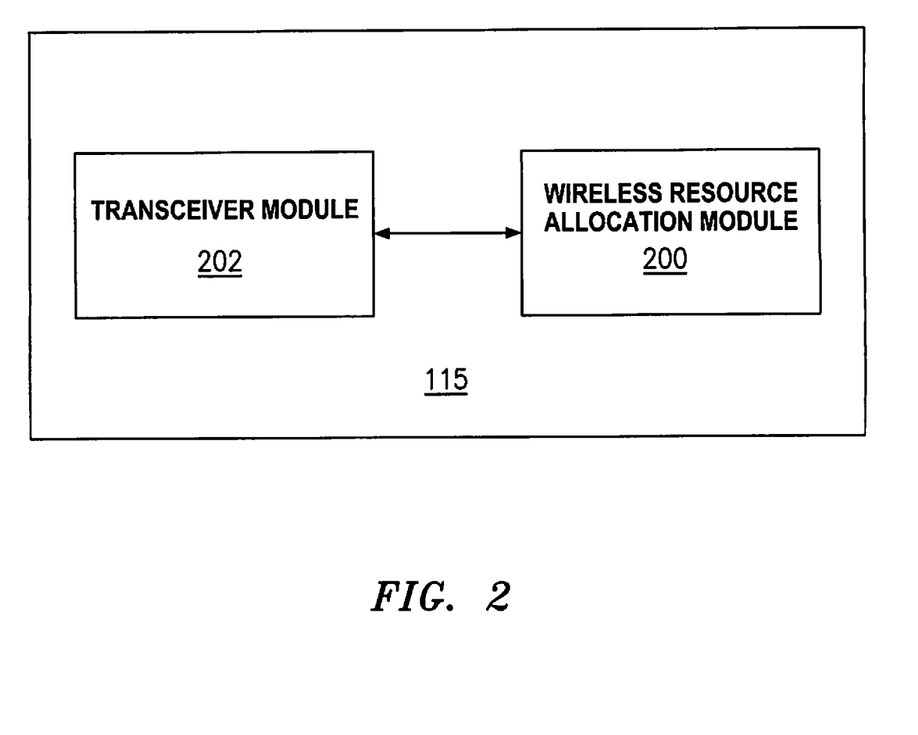
FIG. 2 is a block diagram illustrating an example embodiment of an eNodeB.

FIG. 2 is a block diagram illustrating an example embodiment of an eNodeB 115 in more detail. Although FIG. 2 illustrates an eNodeB 115, it should be understood that the UEs 105 may also include the components shown in FIG. 2. Moreover, in addition to the components shown in FIG. 2, each of the eNodeB 115 and the UEs 105 include conventional components providing conventional functionality that is well-known in the art.

Referring to FIG. 2, the eNodeB 115 includes a wireless resource allocation module 200 and a transceiver or transceiver module 202. The wireless resource allocation module 200 and the transceiver 202 are communicatively coupled to one another. The functions of the wireless resource allocation module 200 and the transceiver 202 will be discussed in more detail later. In addition to the functionality discussed herein, each of the wireless resource allocation module 200 and the transceiver 202 are capable of conventional, well-known functionality. The wireless resource allocation module 200 may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

At least some example embodiments will be discussed herein with regard to allocation of wireless resources and transmission of control information (e.g., downlink control information (DCI) messages) on the downlink (from eNodeB to UE), and allocation of wireless resources and transmission of control information (e.g. HARQ-ACK) on the uplink (from UE to eNodeB).

According to at least one example embodiment, the eNB 115 assigns index values for control channel elements, the control channel elements being allocated to at least one of first and second control channel transmission sets, the uplink resources being based on the index values, and an uplink resource for the first control channel transmission being different than an uplink resource for the second control channel transmission.

In Release 10, the PUCCH resource assignment of formats 1/1a/1b is implicitly derived from $$n_{PUCCH}^{(1)} = n_{CCE} + n_{PUCCH}^{(1)} \qquad (1)$$

where $n_{CCE}$ is the number of the first CCE (i.e., lowest CCE index used to construct the PDCCH) used for transmission of the corresponding DCI assignment and $N_{PUCCH}^{(1)}$ is the boundary index configured by higher layers.

The inventors have discovered that akin to the PDSCH scheduled by legacy PDCCH, the acknowledgement/negative acknowledgement resource in response to the PDSCH transmission scheduled by EPDCCH could be determined based on ECCE indexing.

Figure 3:
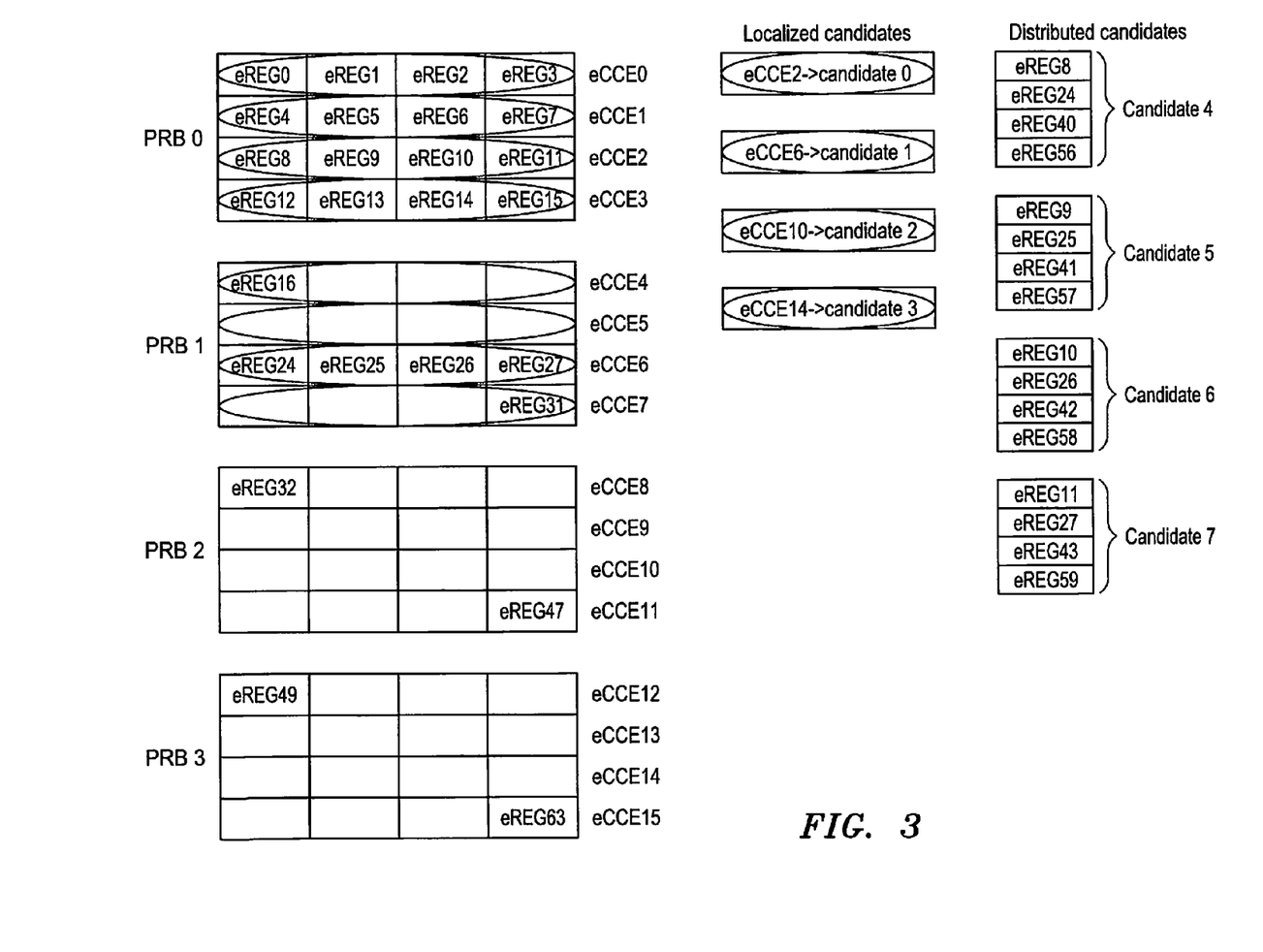
FIG. 3 illustrates an example of EREGs, ECCEs, and a search space for EPDCCH.

FIG. 3 illustrates an example of an EPDCCH search space. As an example, in FIG. 3, each PRB pair PRB0, PRB1, PRB2 and PRB3 includes 4 localized ECCEs ECCE0-ECCE15, and the ECCEs are indexed sequentially. Localized candidate 0 constitutes ECCE2, localized candidate 1 constitutes ECCE6, localized candidate 2 constitutes ECCE10 and localized candidate 3 constitutes ECCE14.

Each distributed ECCE includes 4 EREGs out of EREG0-EREG63, which are distributed into the 4 PRB pairs PRB0, PRB1, PRB2 and PRB3. EREGs EREG8, EREG24, EREG40 and EREG56 constitute one distributed ECCE, distributed candidate 4. Distributed candidate 5 constitutes EREGs EREG9, EREG25, EREG41 and EREG57. Distributed candidate 6 constitutes EREGs EREG10, EREG26, EREG42 and EREG58. Distributed candidate 7 constitutes EREGs EREG11, EREG27, EREG43 and EREG59.

In FIG. 3, localized transmission sets and distributed transmission sets share the same PRB pairs.

Each UE monitors a certain number of candidates within at least one of the localized and distributed transmission set, and the eNodeB can use any of these candidates to transmit downlink control information to the UE.

Figure 4A:
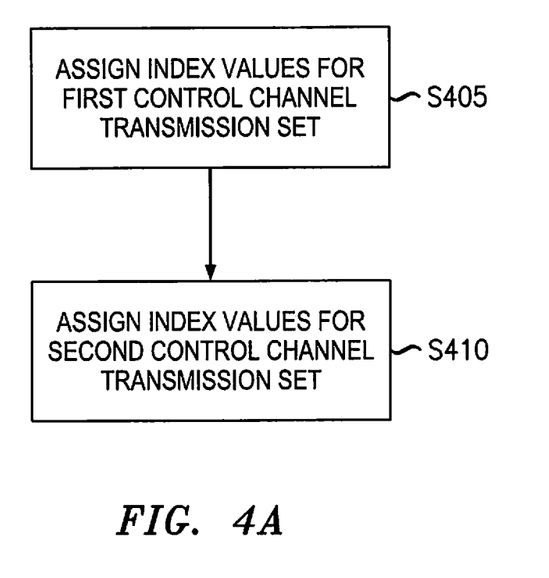
FIG. 4A illustrates a method for determining uplink resources according to an example embodiment.

FIG. 4A illustrates a method for determining uplink resources according to an example embodiment.

In the method of FIG. 4A, distributed and localized transmissions occupy separate PRB pairs and a resource allocation module (e.g., the wireless resource allocation module 200) indexes the localized ECCEs and the distributed ECCEs separately. However, it should be understood that the method shown in FIG. 4A may be implemented if some PRB pairs are occupied by both distributed and localized transmission. In this context, the UE knows which parts of the PRB pairs are used by localized and distributed transmissions.

The resource allocation module assigns index values for control channel elements, the control channel elements being allocated to at least one of first and second control channel transmission sets, the uplink resources being based on the index values, and an uplink resource for the first control channel transmission being different than an uplink resource for the second control channel transmission.

The first control channel transmission set is for localized transmissions and the second control channel transmission set is for distributed transmissions.

The assigning index values includes the resource allocation module assigning the index values for the first control channel transmission set (localized) such that the index values for the first control channel transmission set are sequential at 5405.

The resource allocation module indexes the localize ECCEs sequentially. Using FIG. 3 as an example, the localized ECCEs are indexed sequentially, from ECCE0 to ECCE15.

The assigning index values includes the resource allocation module assigning the index values for the second control channel transmission set (distributed) such that the index values for the second control channel transmission set are sequential at 5410.

From the index values for the ECCEs, a UE can determine a PUCCH resource for transmission of HARQ-ACK.

The resource allocation module indexes the distributed ECCEs sequentially based on the position of the EREGs within the distributed ECCEs. In an example embodiment, the distributed ECCE can be indexed based on the position of the first EREG within the ECCE. To ensure that the indices for uplink resources corresponding to localized ECCEs and distributed ECCEs are unique, the resource allocation module adds an offset to the distributed ECCE index when determining the uplink resources. This offset can be signaled to the UE, for example.

In an example embodiment, the offset corresponds to the number of localized ECCEs. Using FIG. 3 as an example, the resource allocation modules adds sixteen (16 localized ECCEs) to the uplink resources corresponding to distributed ECCEs. Therefore, the uplink resource corresponding to the distributed ECCE0 is 16.

In another example embodiment, the offset corresponds to the number of distributed ECCEs.

Figure 4B:
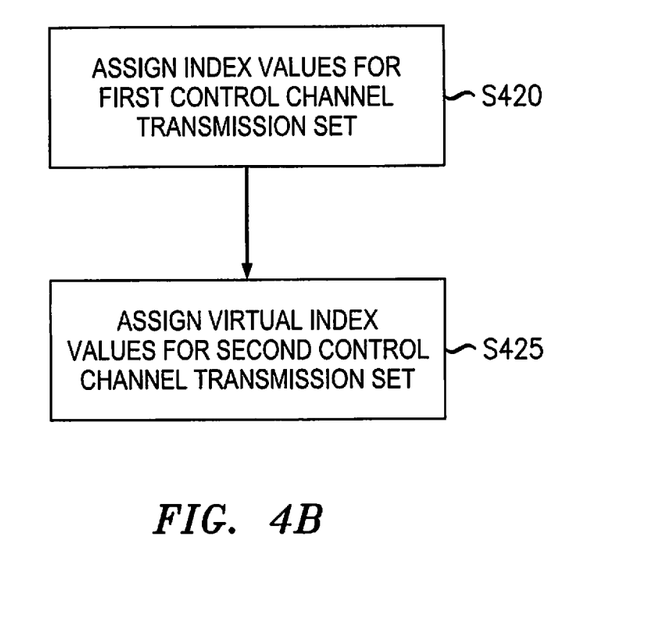
FIG. 4B illustrates a method for determining uplink resources according to an example embodiment.

FIG. 4B illustrates a method for determining uplink resources according to an example embodiment. In the method of FIG. 4B, PRB pairs may be occupies by both distributed and localized transmissions.

In the method of FIG. 4B, the resource allocation module assigns index values for control channel elements, the control channel elements being allocated to at least one of first and second control channel transmission sets, the uplink resources being based on the index values, and an uplink resource for the first control channel transmission being different than an uplink resource for the second control channel transmission.

The assigning index values includes the resource allocation module assigning the index values for the first control channel transmission set (localized) such that the index values for the first control channel transmission set are sequential at 5420. Referring to FIG. 3, the resource allocation module indexes the localized ECCEs sequentially (ECCE0-ECCE15).

For each localized transmission, the index of the corresponding localized ECCE can be used directly for determining uplink resource.

The assigning index values includes the resource allocation module assigning virtual index values for the second control channel transmission set based on the index values for the first control channel transmission set at S425.

For distributed ECCEs, the resource allocation module assigns a virtual ECCE index to the distributed ECCEs.

Assuming the first EREG for distributed ECCE is the $n^{th}$ EREG within the localized ECCE, the virtual ECCE index is defined as the localized ECCE index corresponding to the nth EREG within the distributed ECCE. Using FIG. 3 as example, for distributed candidate 5, the first EREG of distributed candidate 5 is EREG9, which is the second EREG within localized ECCE2, so the virtual ECCE index of this distributed ECCE becomes the localized ECCE index corresponding to the second EREG for distributed candidate 5, which is eREG25. EREG25 is in localized ECCE6, so the resource allocation module assigns a virtual index of distributed candidate 5 to be 6.

Therefore, the PUCCH Format 1a/1b resource is implicitly determined by the UE from ECCE index 6. With this approach, the virtual ECCE indices corresponding to candidates 4, 5, 6, and 7 are 2, 6, 10, and 14, respectively. The virtual ECCE index defined this way is unique for distributed candidates and does not conflict with the ECCE index used by localized transmission, since in a given subframe, a given ECCE cannot be used for both localized and distributed transmission.

Utilizing this approach, the UE knows which PRB pairs are used for EPDCCH. The advantage is that the UE does not need to know which PRB pairs are used for distributed transmission and which PRB pairs are used for localized transmission. This allows the eNB to schedule distributed and localized transmission for the UEs more flexibly, without the need for additional signaling each time.

Figure 5A:
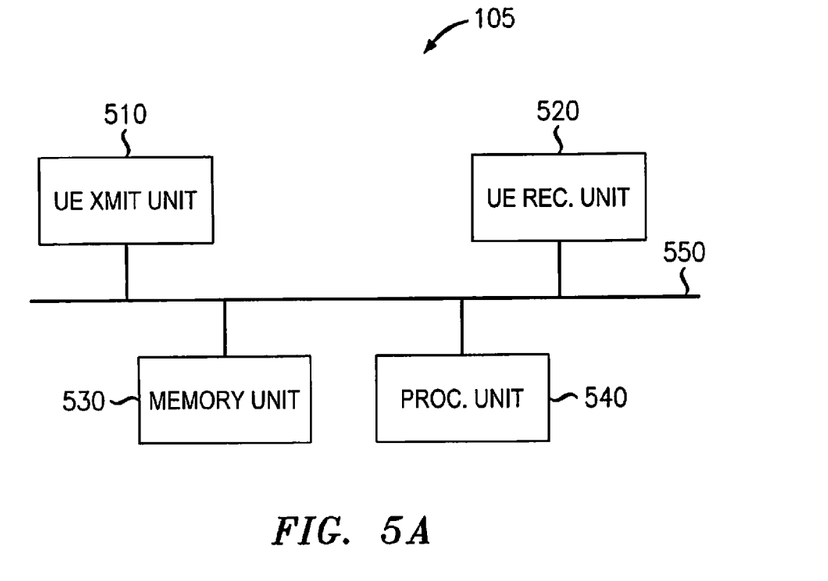
FIG. 5A illustrates an example embodiment of a UE.

FIG. 5A illustrates an example embodiment of the UE 105. It should be also understood that the UE 105 may include features not shown in FIG. 5A and should not be limited to those features that are shown.

The UE 105 is configured to transition from a connectionless mode to a connected mode.

The UE 105 may include, for example, a transmitting unit 510, a UE receiving unit 520, a memory unit 530, a processing unit 540, and a data bus 550.

The transmitting unit 510, UE receiving unit 520, memory unit 530, and processing unit 540 may send data to and/or receive data from one another using the data bus 550. The transmitting unit 510 is a device that includes hardware and any necessary software for transmitting wireless signals on the uplink (reverse link) including, for example, data signals, control signals, and signal strength/quality information via one or more wireless connections to other wireless devices (e.g., base stations).

The UE receiving unit 520 is a device that includes hardware and any necessary software for receiving wireless signals on the downlink (forward link) channel including, for example, data signals, control signals, and signal strength/ quality information via one or more wireless connections from other wireless devices (e.g., base stations). The UE receiving unit 520 receives information from the base station 110.

The memory unit 530 may be any storage medium capable of storing data including magnetic storage, flash storage, etc.

The processing unit 540 may be any device capable of processing data including, for example, a microprocessor configured to carry out specific operations based on input data, or capable of executing instructions included in computer readable code. The processing unit 540 is configured to determine uplink channel resources based on index values of control channel elements on the downlink, the control channel elements being allocated to at least one of first and second control channel transmission sets, an uplink resource for the first control channel transmission being different than an uplink resource for the second control channel transmission.

For example, the processing unit 540 is configured to determine uplink channel resources (e.g., HARQ ACK) based on the index values determined from the methods shown in FIGS. 4A-4B.

Figure 5B:
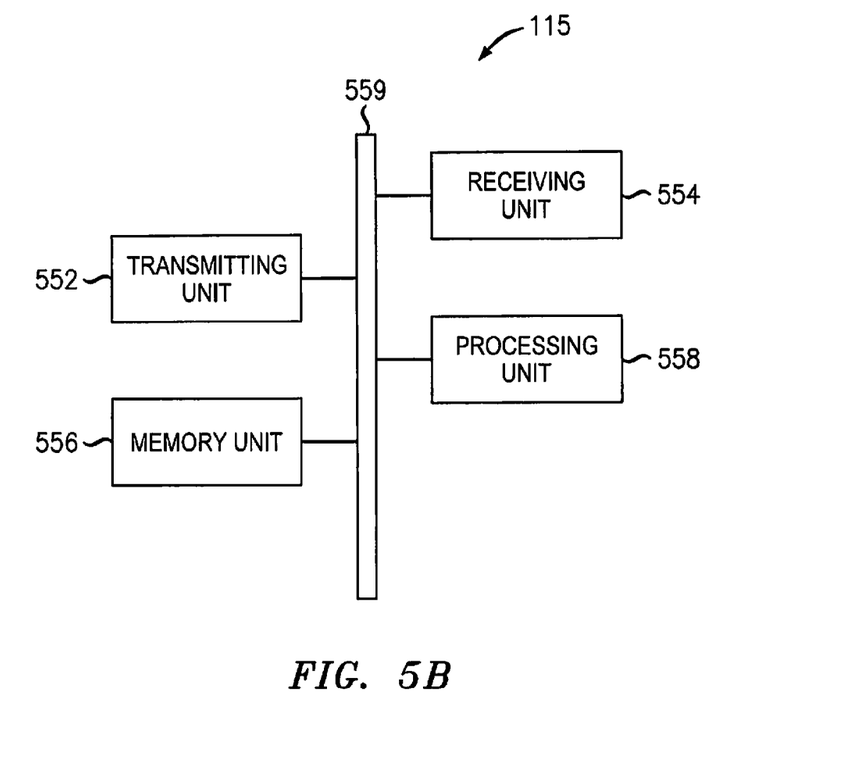
FIG. 5B illustrates an example embodiment of a base station.

FIG. 5B illustrates an example embodiment of a base station 115. It should be also understood that the base station 115 may include features not shown in FIG. 5B and should not be limited to those features that are shown.

Referring to FIG. 5B, the base station 115 may include, for example, a data bus 559, a transmitting unit 552, a receiving unit 554, a memory unit 556, and a processing unit 558.

The transmitting unit 552, receiving unit 554, memory unit 556, and processing unit 558 may send data to and/or receive data from one another using the data bus 559. The transmitting unit 552 is a device that includes hardware and any necessary software for transmitting wireless signals including, for example, data signals, control signals, and signal strength/quality information via one or more wireless connections to other network elements in the wireless communications network 100.

The receiving unit 554 is a device that includes hardware and any necessary software for receiving wireless signals including, for example, data signals, control signals, and signal strength/quality information via one or more wireless connections to other network elements in the network 100.

The memory unit 556 may be any device capable of storing data including magnetic storage, flash storage, etc. The memory unit 256 is used for data and controlling signal buffering and storing for supporting pre-scheduling and the scheduled data transmissions and re-transmissions.

The processing unit 558 may be any device capable of processing data including, for example, a microprocessor configured to carry out specific operations based on input data, or capable of executing instructions included in computer readable code.

For example, the processing unit 558 is configured to implement the methods shown in FIGS. 4A-4B.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method for determining uplink resources, the method comprising:
    assigning index values for control channel elements, the control channel elements being allocated to at least one of first and second control channel transmission sets, the uplink resources being based on the index values, and an uplink resource for the first control channel transmission being different than an uplink resource for the second control channel transmission, wherein the first control channel transmission set are for localized transmissions and the second control channel transmission set are for distributed transmissions and the assigning index values for control channel elements includes,
    assigning the index values for the first control channel transmission set such that the index values for the first control channel transmission set are sequential; and
    assigning virtual index values for the second control channel transmission set based on the index values for the first control channel transmission set.

2. The method of claim 1, wherein the control channel elements are enhanced control channel elements.

3. The method of claim 1, wherein the assigning virtual index values for the second control channel transmission set includes,
    determining a first resource element group in a first distributed control channel element;
    determining a position of the first resource element group in the localized control channel element; and
    determining the virtual index value for the first distributed control channel element based on the position of the first resource element group in the localized control channel element.

4. The method of claim 1, wherein the first and second control channel transmission sets share a same set of physical resource block pairs.

5. The method of claim 1, wherein the first and second control channel transmission sets have different sets of physical resource block pairs.

6. A base station comprising:
    a memory; and
    a processor configured to assign index values for control channel elements, the control channel elements being allocated to at least one of first and second control channel transmission sets, uplink resources being based on the index values, and an uplink resource for the first control channel transmission being different than an uplink resource for the second control channel transmission, wherein the processor is configured to,
    assign the index values for the first control channel transmission set such that the index values for the first control channel transmission set are sequential; and
    assign virtual index values for the second control channel transmission set based on the index values for the first control channel transmission set.

7. The base station of claim 6, wherein the processor is configured to,
    determine a first resource element group in a first distributed control channel element;
    determine a position of the first resource element group in the localized control channel element; and
    determine the virtual index value for the first distributed control channel element based on the position of the first resource element group in the localized control channel element.

8. The base station of claim 6, wherein the first and second control channel transmission sets share a same set of physical resource block pairs.

9. The base station of claim 6, wherein the first and second control channel transmission sets have different sets of physical resource block pairs.

* * * * *